United States Patent Office 3,023,906
Patented Mar. 6, 1962

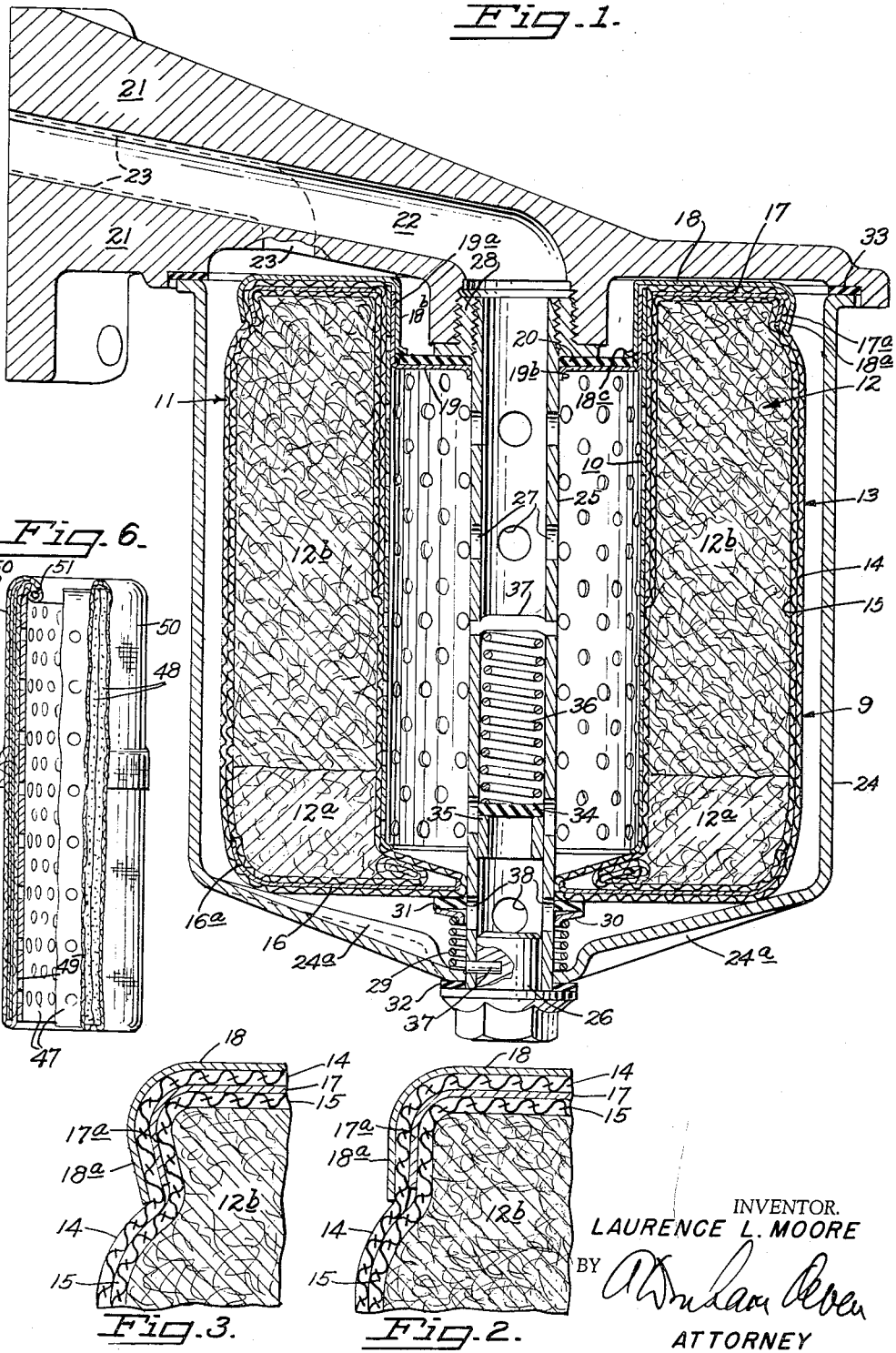

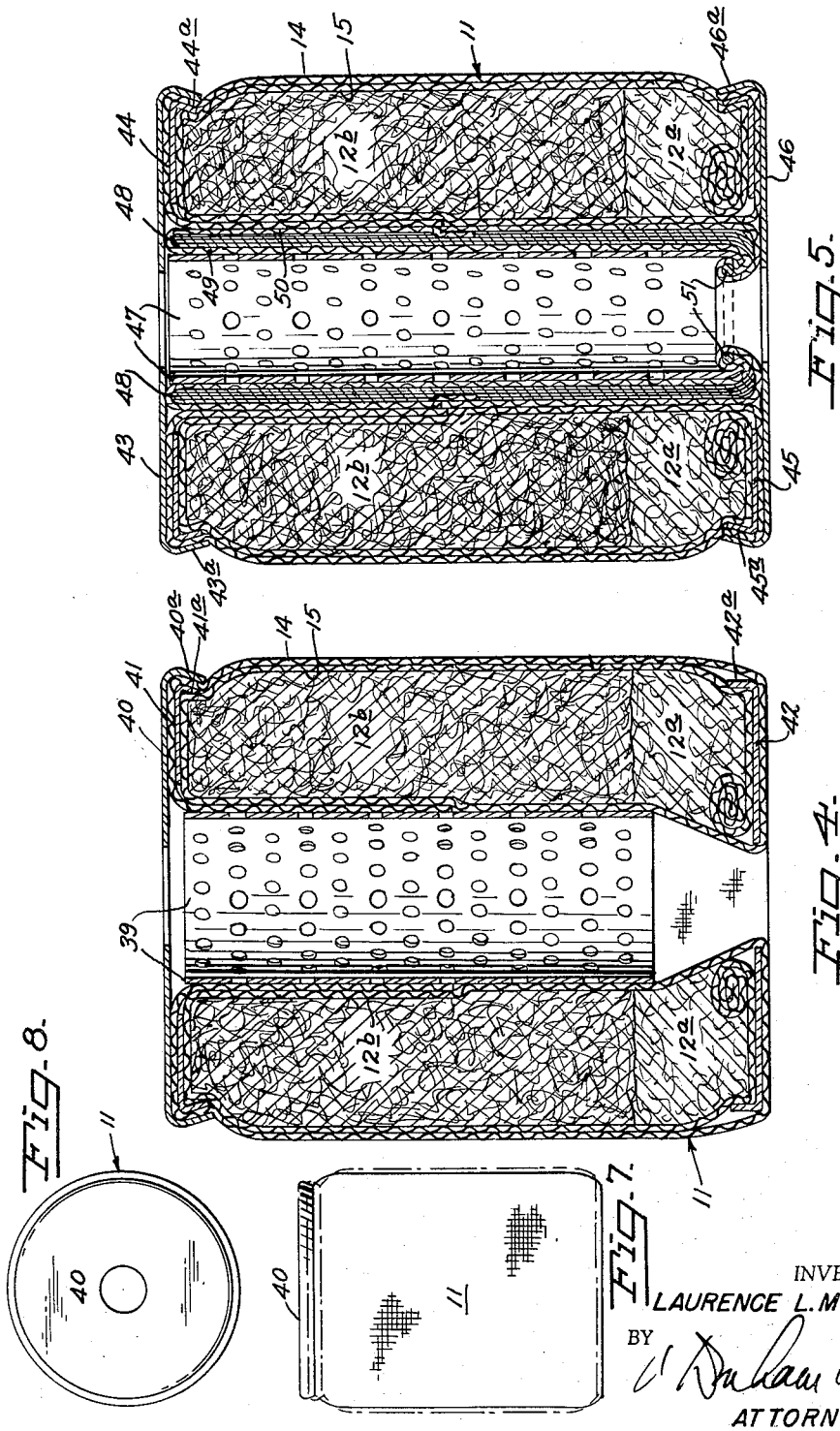

3,023,906
FILTER
Laurence L. Moore, Oakland, Calif., assignor to Winslow Engineering and Manufacturing Company, Oakland, Calif., a corporation of California
Filed Nov. 21, 1958, Ser. No. 775,521
9 Claims. (Cl. 210—484)

This invention relates to improvements in apparatus for filtering a current of fluid. More particularly, the invention relates to an improved lubricating oil or gasoline filtering device. Still more specifically, the invention involves improvements in the knitted-sock type of oil or gasoline filtering cartridges.

Knitted-sock types of fluid-filtering devices such as described in U.S. Patent No. 2,314,640 and Re. 24,138, to myself and Charles A. Winslow, and U.S. Patent No. 2,613,814 to myself, have given excellent results, especially in filtering oil and gasoline. These results are due in great part to the ability of the filter cartridge to grow or swell and thereby to continually open up pores in the knitted covering. Because of this growth factor, these cartridges continue to efficiently remove undesirable foreign matter from the fluid over a period many times the life of other types of filter cartridges.

The filter material used in these knitted-sock filter cartridges requires firm support to maintain it in the correct position for successful, efficient performance of its duties. Such support is commonly provided by a perforate, metal center tube extending lengthwise from one end of the filter to the other, and sometimes combined with annular, washer-like end supports positioned at the ends of the filter perpendicular to the axis of the center tube. However, after continued use the filtrant becomes tightly packed around the center tube and resists removal of the used cartridge from its housing. When an attempt is made to forcibly extract the used cartridge by grasping and pulling on the filter element (i.e., the filter material and its knitted covering) and/or the end supports, separation of the filter element from the supporting members and center tube often occurs, necessitating further effort and time to completely remove the entire cartridge.

Another difficulty encountered (this in severe, prolonged use of the cartridge) is that of sagging of the filter element, resulting in separation of said element from the supporting elements of the cartridge, unfiltered oil leaking past the element and therefore a loss of the filtering effect. This sagging takes place even with the filter cartridges compressed into place and may result from any one of a number of causes, such as vibration, jolting, and sudden strong surges of air or oil during starting of a cold engine. Once the filter material has been displaced from its supporting members its usefulness is lost and replacement is necessary, there being no feasible way to reunite the used filter element with the rest of the cartridge.

Although numerous attempts have been made to overcome these problems by firmly and lastingly uniting the filter element to its supports, such as by the use of extensible bands around the filter element, by spot-welding the supports together, and by gluing the filter element to its supports, none have proved entirely satisfactory until the present invention was made.

It is, therefore, an object of the present invention to provide a knitted-sock filter cartridge which not only incorporates the best features of the cartridge shown in U.S. Patents Nos. 2,314,640, 2,613,814, and Re. 24,138, but in which the elements are securely united, one to the other, and will remain so over a long, sustained period of use.

Another object of this invention is to provide a knitted-sock filter cartridge wherein the center tube is securely fastened to the porous filtering element.

Another object of the invention is to provide a knitted-sock filter cartridge which is easily removable from its container in one piece.

Still another object of the present invention is to provide a knitted-sock filter cartridge suitable for long periods of severe use without danger of the filter element sagging and separating from its supports.

Other objects and advantages of the invention will become apparent from the following description of several embodiments thereof, selected for illustrative purposes only and shown in the accompanying drawings, in which:

FIG. 1 is a vertical sectional view of a complete filter unit comprising a filter cartridge made in accordance with the present invention and a housing therefor;

FIG. 2 is a fragmentary enlarged vertical sectional view of the upper left-hand corner of the cartridge in FIG. 1, before the crimping step is performed;

FIG. 3 is a view like FIG. 2 of the same cartridge corner after the crimping step has been performed;

FIG. 4 is a vertical sectional view of a modified form of cartridge also embodying the invention;

FIG. 5 is a vertical sectional view of still another modified form of filter cartridge made in accordance with the present invention;

FIG. 6 is a vertical sectional view of the center tube assembly used in the cartridge of FIG. 5;

FIG. 7 is a view in side elevation on a reduced scale of a cartridge of the present invention, showing the size and shape of the cartridge both before and after compression in the housing; and FIG. 8 is a top plan view of the filter cartridge in FIG. 7.

Referring now to the drawings in greater detail, the filter cartridge 9 shown in FIG. 1 comprises a perforated, firm center tube 10, usually of metal, snugly engaging the inner wall of an annular filtering element 11 which is filled with filter material 12 consisting of a lower layer 12a of very porous filter material and an upper layer 12b of more dense filter material. Tightly and completely covering the inner, outer, and end surfaces of the porous filtering material 12 is a double-layered, pervious, extensible knitted sheath 13 with outer layer 14 and inner layer 15. On the bottom end of the element 11, between the outer layer 14 and the inner layer 15, resides an annular, washer-like, rigid support member 16, preferably of metal, with a peripheral flange 16a. At the top end of the element 11 and likewise situated between the layers 14, 15 is an inner, rigid, annular, washer-like locking support member 17, preferably of metal, with a peripheral flange 17a. Exterior of the outer layer 14 at the top end of the cartridge 9 is an outer, rigid, annular, washer-like support member 18, also preferably of metal, with inner flanges 18b and 18c, and also with peripheral flange 18a tightly crimped around the peripheral flange 17a of the inner locking support member 17. Between the center tube 10 and the inner flange 18b lies the outer flange 19a of annular washer 19. The inner flange 19b of the washer 19 rests against the central cartridge support 25, thereby providing centering of, and preventing lateral movement of, the cartridge 9 in its housing. Abutting the top surface of the washer 19 and held in place by the flange 18c of the support 18 is a washer-like gasket 20, preferably of rubber, which functions as a seal between the washer 19 and, therefore, the entire top of the cartridge 9, and the engine filter adapter 21, via bushing 28. It is readily seen, therefore, that through the layers 14, 15 of the knitted sheath 13, the inner supporting washer 17, the outer supporting washer 18, and the annular washer 19, a firm unification of the filter material 12 to the center tube 10 is established.

The housing for the filter cartridge may be of the conventional, removable-cover type, such as that illustrated in FIG. 1, comprising an engine filter adapter 21 with filter inlet passage 23 and outlet passage 22; a shell 24 with strengthening ribs 24a; a hollow, central cartridge support 25, closed at its lower end by a plug 26 which is secured to the cartridge support 25 by pin 39, said cartridge support perforated by holes 27 and joined to the engine filter adapter 21 through a bushing 28. A spring 29 seated on the lower end of the shell 24 applies pressure upwardly against the filter cartridge 9 through flanged retainer ring 30 and gasket 31. A gasket 32 seals the central cartridge support 25 to the shell 24, and a gasket 33 seals the shell 24 to the engine filter adapter 21. The central cartridge support 25 contains a safety valve 34, normally held in a downward position against stop-ring 35 by spring 36 seated on retainer pin 37, which serves to open a by-pass 38 for the fluid being filtered, when the accumulation of filtrant is sufficient to prevent normal flow through the filter element 11.

FIG. 2 shows the inner supporting washer 17 and the outer supporting washer 18 of the filter cartridge 9 during a stage of its construction immediately after said outer washer 18 has been placed over the outer sheath layer 14 at the end of the filter cartridge. To establish a tight, secure seal between the two washers 17, 18 and thereby unify the filter element 11 and the center tube 10, the flanges 17a and 18a of said washers 17, 18 respectively, are turned in, as by crimping, toward the center of the filter cartridge, as illustrated in FIG. 3. This crimping is done by application of inward pressure simultaneously at all points around the flange 18a, causing said flange 18a to bend inwardly against the flange 17a and thereby causing said flange 17a to also bend inwardly. Since the outer layer 14 of the knitted sheath 13 lies between the flanges 17a and 18a, the outer layer 14 along with the washer 17 is firmly gripped by the crimped-in washer 18. This new and unique manner of forming a secure, immovable junction between the sheathing 13 and the outer washer 18 completes the unification of the filter element 11 with the center tube 10, resulting in a cartridge which will withstand great stresses such as are encountered in prolonged, severe use with a build-up of a heavy deposit of filtrant. The cartridge incorporating this new, cooperative relationship between the outer and inner washers and the knitted-sock sheathing will not break apart when it is removed from its housing, even when a great force is necessary to effect the removal.

A modified version of the preferred filter cartridge of FIG. 1 is illustrated in FIG. 4. In the modification the union between the center tube 39 and the filter element 11 varies from that illustrated in FIG. 1, in that there is no metallic attachment of said center tube 39 to the outer supporting washer 40. This filter cartridge is designed for use where a great build-up of filtrant in the center tube 39 is not encountered. The center tube 39 serves as a lateral support for the filter element 11, maintaining an open core through the center of said element, and also affords some degree of support lengthwise. The inner supporting washer 41 lies between the two sheathing layers 14, 15 in the same manner as the inner supporting washer 17 of FIG. 1, and the flange 40a of the outer supporting washer 40 is crimped around the flange 41a of the inner supporting washer 41, and in the same way as the outer washer flange 18a is crimped to the inner washer flange 17a. The washer 42 with its flange 42a serves as a support, much the same as the washer 16. The filter element 11, via the sheathing layers 14, 15, is thereby strongly joined to the outer washer 40. When in use, the outer washer 40 is firmly held against the engine filter adapter (not shown) so that any tendency of the filter material to sag and rupture the seals between the cartridge and its housing is eliminated.

Another modification of the invention is shown in FIG. 5, wherein an outer washer crimped around an inner washer occurs at both ends of the filter cartridge. At the top of the cartridge the flange 43a of outer washer 43 is crimped around the flange 44a of inner washer 44 with outer sheathing layer 14 lying therebetween. Similarly, at the bottom of the cartridge the outer sheathing layer 14 is firmly held between inner washer 45 and outer washer 46 by virtue of their crimped flanges 45a and 46a, respectively. The center tube assembly in the cartridge of FIG. 5 is also a modification. The center tube 47 extends practically the entire length of the filter element 11, and therefore acts as a lengthwise as well as a lateral support of said filter element 11. If an extra-fine filtering aid around the center tube 47 is desirable, as when filtering gasoline, said center tube 47 may be wrapped with a fine, dense filter paper, or cloth, 48, which is encased in a sleeve comprising an inner layer 49 and an outer layer 50 of the same type of material used as the knitted sheathing 12. Sleeve retainer ring 51 is positioned at one end of the center tube 47, between the sleeve layers 49, 50. By virtue of the fact that the ring 51 is smaller in diameter than the center tube 47, when said center tube 47 is inserted in the filter element 11, the ring 51 serves to maintain the filter paper 48 and the sheathing layers 49, 50 in proper position.

Referring again to FIG. 1, when the cartridges of this invention are placed in use, the gasket 32, the shell 24, the spring 29, the retainer ring 30, the gasket 31, and the filter cartridge 9, respectively, are placed in position around the central cartridge support 25, the gasket 33 is placed in position on the engine filter adapter 21, the shell 24 is seated properly against the gasket 33, and the central cartridge support 25 is tightly screwed into the bushing 28 by application of torque at plug 26. In removal of the cartridge, the reverse procedure is followed.

The design of the filter cartridges made in accordance with this invention is such that upon installation in the housing lengthwise compression of the cartridge takes place. This compression shortens the length of the cartridge and increases the diameter thereof. This change in shape is illustrated by FIGS. 7 and 8, wherein the solid lines indicate the size of the cartridge before installation and compression, and the broken lines the size subsequent to said installation and compression. Because of this compression, a tight seal of the cartridge through the gaskets to its housing is assured, preventing any danger of leaks and loss of filtering action.

In the construction of the improved filter cartridge, after the inner layer 15 of the knitted sheath 13 has been applied to the filter material 12 and before the outer layer 14 has been wrapped around said inner layer 15, the inner washer 17 and the washer 16 are placed in position abutting opposite ends of the partially formed filter element. When the outer layer 14 is subsequently tightly wound around the inner layer 15, the two washers 16, 17 are firmly united to the filter material 12. When the outer washer 18 is crimped tightly over and around the washer 17, the result is a unique combination of elements interacting in a novel manner to produce a firm, strong, highly durable and efficient filter cartridge.

From the foregoing description of the various embodiments of the present invention, it will be appreciated that a filtering unit has been provided which satisfactorily accomplishes the several objects recited in the introductory portion of this specification. While the invention has been illustrated with reference to certain specific filtration problems, it will be apparent to those skilled in the art to which the invention pertains that the type of filtration problems described are not peculiar alone to the filtration of lubricating oil or gasoline for engines and other machines. The general principles employed in the illustrated embodiments of the invention will be found to be applicable to other types of filtration problems, and various modifications of the structural details disclosed herein can obviously be made without departing from the true spirit and scope of the invention as defined in the appended claims.

I claim:
1. A fluid filtering conditioner comprising: a housing comprising an engine filter adapter, a removable filter shell, a tubular cartridge support, and a spring for exerting pressure between a filter cartridge and the filter shell; and a filter cartridge comprising a tubular mass of porous, fibrous filtering material having inner and outer peripheral surfaces and end wall surfaces; a two-layered, porous, knitted sheath with the inner layer completely enclosing said tubular filter mass and covering said peripheral and end wall surfaces; two inner, annular, washer-like support members with diameters substantially equal to that of the filter mass, and each positioned adjacent an opposite end of the filter mass and between the two sheath layers, the first support member with an outer peripheral flange perpendicular to the plane of the remainder of the member, and the second support member with an outer peripheral flange extending inwardly in a direction generally toward the center of the filtering cartridge; a perforated, rigid center tube positioned snugly against the sheath covered, inner peripheral surface of the filter mass and extending substantially the length thereof; an outer, annular, washer-like support member abutting the outer sheath-layer covering the second inner support, with an outer peripheral flange tightly crimped around the outer peripheral flange of the said second inner support, and also with an inner annular flange, perpendicular to the plane of the body of said outer support, extending into the hollow core of the filter mass in close relationship to the center tube; and an annular, washer-like central cartridge support positioned inside the center tube with the plane of its body perpendicular to the axis of the center tube, and with an outer peripheral annular flange, perpendicular to said body plane, positioned in abutting relationship between the center tube and the inner, annular flange of the outer support.

2. A fluid filtering conditioner comprising: a housing comprising an engine filter adapter, a removable filter shell, a tubular cartridge support, and a spring for placing a filter cartridge under compressive force; and a filter cartridge comprising a hollow, cylindrical mass of porous, fibrous, filtering material separated into an upper and a lower stratum, the strata having different densities to provide efficient filtration at all fluid viscosities; a two-layered, porous, knitted sheath with the inner layer in intimate contact with the entire surface of the filter mass; two inner, annular, washer-like support members with diameters substantially equal to that of the filter mass, and each positioned adjacent an opposite end of the filter mass and between the two sheath layers, the first support member with an outer peripheral flange perpendicular to the plane of the remainder of the member, and the second support member with an outer peripheral flange extending inwardly in a direction generally toward the center of the filtering device; a perforated, rigid center tube positioned snugly against the sheath-covered, hollow core-forming surface of the filter mass and extending substantially the length thereof; and a two-section, outer, annular support member, abutting the outer sheath layer covering the second inner support, one section having the shape of a substantially flat, washer-like body, and the other section shaped as an outer peripheral flange tightly crimped around the outer peripheral flange of the inner support.

3. A fluid filtering conditioner comprising: a housing comprising an engine filter adapter, a removable filter shell, a tubular cartridge support, and a spring for placing a filter cartridge under compressive force; and a filter cartridge comprising a hollow, cylindrical mass of porous, fibrous filtering material separated into an upper and a lower stratum, the strata having different densities to provide efficient filtration at all fluid viscosities; a two-layered, porous, knitted sheath with the inner layer in intimate contact with the entire surface of the filter mass; two inner, annular, washer-like support members with diameters substantially equal to that of the filter mass, each positioned adjacent an opposite end of the filter mass between the two sheath layers and both with an outer peripheral flange extending inwardly in a direction generally toward the center of the filtering device; a perforated, rigid center tube positioned snugly against the sheath-covered, hollow, core-forming surface of the filter mass and extending substantially the length thereof, the outer surface of the center tube covered with a thin layer of fine, yet porous, filter material enclosed within a layer of knitted sheath held in position around said center tube via a retainer ring, said retainer ring being of smaller diameter than the center tube and lying inside the end loop of the said knitted sheath covering the fine filter material; and two outer, annular, washer-like support members each positioned at opposite ends of the filter abutting the outer sheath layer covering the inner support members, and each said outer support member with an outer peripheral flange tightly crimped around the outer peripheral flange of the adjoining inner support member.

4. A liquid filtering device adapted for compression in a sealed housing, comprising: a cylindrical, flat-ended, tubular mass of porous, fibrous filtering material having a central hollow core; porous, knitted sheath completely enclosing said mass, having plural layers at said flat ends with an inside layer abutting all surfaces of the filter mass and an outside layer; two inner, annular, rigid washer-like support members each positioned adjacent an end of the filter mass and contained between two sheath layers, each said support member having a flat portion extending a substantial portion of the width of said end and a flange extending along the outer periphery of said filter mass toward the opposite end; a perforated, rigid center tube positioned snugly against the outside sheath layer that lines the core of the filter mass and extending a substantial portion of the length thereof; and at least one outer, annular, rigid washer-like support member outside said sheath having a diameter substantially equal to the diameter of the cylindrical filter mass, and with an outer peripheral flange firmly crimped around the outer periphery and flange of one said inner, annular, washer-like support member.

5. The filtering device of claim 4 having only said one outer support member, which has an inner annular flange; and an annular metal cartridge support having a radially outer axial flange sandwiched between the radially inner wall of the said center tube and the radially outer wall of said inner flange, said cartridge support also having a radial flange extending radially inwardly from said axial flange.

6. The filtering device of claim 4 wherein there is only one said outer support member, which has a flat radial portion extending inwardly from the peripheral flange beyond the inner periphery of said center tube.

7. The filtering device of claim 4 having two outer, annular, washer-like support members, one at each end of the device, each having a flat rigid radial wall having a width substantially that of the said filter mass.

8. The device of claim 4 wherein the outer surface of the center tube is covered with a thin layer of fine, yet porous, filter material enclosed within a layer of knitted sheath held in position around said center tube via a retainer ring, said retainer ring being of smaller diameter than the center tube and lying inside the end loop of the said knitted sheath covering the fine filter material.

9. A non-sagging liquid filter adapted for compression in a sealed housing, comprising: a vertical cylindrical flat-ended, tubular mass of porous, fibrous filtering material having a central hollow core and providing an upper and lower stratum, the strata having different densities to provide efficient filtration at all fluid viscosities; a plural-layered, porous, knitted sheath fully enclosing said mass with an inside-layer in contact with the filter mass and an outside layer; two inner, annular, rigid support members, with one positioned adjacent each flat end of the filter mass and contained between two sheath layers, each said inner support member having a flat radial portion covering most of its flat end and an outer flange extending around the outer periphery of said core toward the opposite end; a perforated, rigid center tube in said core positioned snugly against said sheath and extending most of the height of said filter; and at least one outer, annular, rigid support member outside said sheath having a flat end portion covering one end of said mass and an outer peripheral flange firmly crimped around the outer flange of one said inner support member.

References Cited in the file of this patent

UNITED STATES PATENTS

| | | |
|---|---|---|
| 2,067,439 | Dooley | Jan. 12, 1937 |
| 2,543,481 | Wicks | Feb. 27, 1951 |
| 2,559,267 | Winslow | July 3, 1951 |
| 2,597,770 | Alexander | May 20, 1952 |
| 2,724,176 | White | Nov. 22, 1955 |
| 2,850,168 | Nostrand | Sept. 2, 1958 |
| 2,875,901 | Bottum | Mar. 3, 1959 |